US010150657B2

(12) United States Patent
Miyoshi

(10) Patent No.: US 10,150,657 B2
(45) Date of Patent: Dec. 11, 2018

(54) CRANE

(71) Applicant: Hitachi Sumitomo Heavy Industries Construction Crane Co., Ltd., Taito-ku, Tokyo (JP)

(72) Inventor: Kota Miyoshi, Obu (JP)

(73) Assignee: Hitachi Sumitomo Heavy Industries Construction Crane Co., Ltd., Tokyo (JP)

( * ) Notice: Subject to any disclaimer, the term of this patent is extended or adjusted under 35 U.S.C. 154(b) by 119 days.

(21) Appl. No.: 15/447,815

(22) Filed: Mar. 2, 2017

(65) Prior Publication Data

US 2018/0065834 A1 Mar. 8, 2018

(30) Foreign Application Priority Data

Sep. 8, 2016 (JP) ................................ 2016-175356

(51) Int. Cl.

*F16D 31/02* (2006.01)
*B66C 23/86* (2006.01)
*B66C 13/16* (2006.01)
*B66C 13/20* (2006.01)
*B66C 23/00* (2006.01)
*F15B 11/044* (2006.01)
*F15B 11/08* (2006.01)

(Continued)

(52) U.S. Cl.

CPC .............. *B66C 23/86* (2013.01); *B66C 13/16* (2013.01); *B66C 13/20* (2013.01); *B66C 23/54* (2013.01); *F15B 11/0445* (2013.01); *F15B 11/08* (2013.01); *F15B 13/0433* (2013.01); *B66C 23/36* (2013.01)

(58) Field of Classification Search

CPC .. F15B 11/0445; F15B 11/08; F15B 13/0433; B66C 23/86; F16H 61/4157
USPC ........................................................... 60/466
See application file for complete search history.

(56) References Cited

U.S. PATENT DOCUMENTS 5,159,813 A * 11/1992 Yoshimatsu ............ B66C 23/86 60/466
8,689,549 B2 * 4/2014 Jene ........................ B66C 23/86 60/403

(Continued)

FOREIGN PATENT DOCUMENTS

JP 2009-121500 A 6/2009

*Primary Examiner* — Michael Leslie
(74) *Attorney, Agent, or Firm* — Crowell & Moring LLP

(57) ABSTRACT

The crane includes a swing brake device installed between a hydraulic motor and a control valve and having a flow restrictor; a first backpressure detector detecting a motor backpressure between the flow restrictor and one of ports of the hydraulic motor; a second backpressure detector detecting a motor backpressure between the flow restrictor and the other port of the hydraulic motor; and a control device. The control device has an external-force direction estimation unit that estimates a swing direction of an upperstructure under an external force acting on the upperstructure on the basis of a motor backpressure detected by the first backpuressure detector and a motor backpressure detected by the second backpressure during an operating state of the swing brake device. The control device has a notification control unit that causes the notification device to provide notification of the estimated swing direction of the upperstructure.

5 Claims, 9 Drawing Sheets

(51) Int. Cl.
*F15B 13/043* (2006.01)
*B66C 23/36* (2006.01)

(56) References Cited

U.S. PATENT DOCUMENTS

| | | | | |
|---|---|---|---|---|
| 8,768,581 | B2 * | 7/2014 | Mizuochi | B66C 23/905<br>701/50 |
| 2013/0164109 | A1 * | 6/2013 | Yamazaki | B66C 23/86<br>60/420 |
| 2018/0051444 | A1 * | 2/2018 | Yamashita | F15B 11/08 |

* cited by examiner

CRANE

TECHNICAL FIELD

The present invention relates to a crane.

BACKGROUND ART

There are known some cranes having a revolving upperstructure mounted swingabaly relative to a frame foaming part of an undercarriage and/or the like. Some of such cranes are configured to swing the revolving upperstructure by inertia when a swing lever is manipulated into its neutral position during the swing motion of the revolving upperstructure. In order to arrest such a swing motion of the revolving upperstructure, the swing lever may be manipulated to turn the revolving upperstructure in the opposite direction to the swinging direction, or alternatively, if a swing brake device is installed, the swing brake device may be actuated to stop the revolving upperstructure, such as disclosed in the Japanese Unexamined Patent Application Publication No. 2009-121500.

SUMMARY OF INVENTION

Technical Problem

In the neutral-free mode cranes, in order to prevent the revolving upperstructure in strong winds from moving at the time of starting the swing motion, the swing brake device is released while the swing motion is being manipulated. However, it is difficult to determine the direction of force acting on the revolving upperstructure under winds, making it difficult for the operator to perform appropriate swing manipulation.

Solution to Problem

A crane in accordance with an aspect of the present invention includes a hydraulic circuit with a hydraulic pump and a hydraulic motor being connected through a control valve having a neutral free position. The crane includes: a notification device; a revolving upperstructure driven to swing by the hydraulic motor; a swing control device controlling the control valve for swing operation of the upperstructure; a swing brake device installed between the hydraulic motor and the control valve and having a flow restrictor that limits a flow of oil on a return side of the hydraulic motor, the swing brake device limiting oil on the return side of the hydraulic motor to generate a hydraulic braking force; a first backpressure detector detecting a motor backpressure between the flow restrictor and one of ports of the hydraulic motor as a first motor backpressure; a second backpressure detector detecting a motor backpressure between the flow restrictor and the other port of the hydraulic motor as a second motor backpressure; and a control device. The control device has: an external-force direction estimation unit that estimates a revolving direction of the revolving upperstructure under an external force acting on the revolving upperstructure on the basis of the first motor backpressure and the second motor backpressure during an operating state of the swing brake device; and a notification control unit that causes the notification device to provide notification of the estimated revolving direction of the upperstructure.

Advantageous Effect of Invention

According to one aspect of the present invention, even if an external force acts on the revolving upperstructure under the influence of winds and/or the like, the swing manipulation is successfully performed in an appropriate manner.

BRIEF DESCRIPTION OF THE DRAWINGS

Non-limiting and non-exhaustive embodiments of the present embodiments are described with reference to the following figures, wherein like reference signs refer to like parts throughout the various views unless otherwise specified.

DESCRIPTION OF EMBODIMENTS

Figure 1:
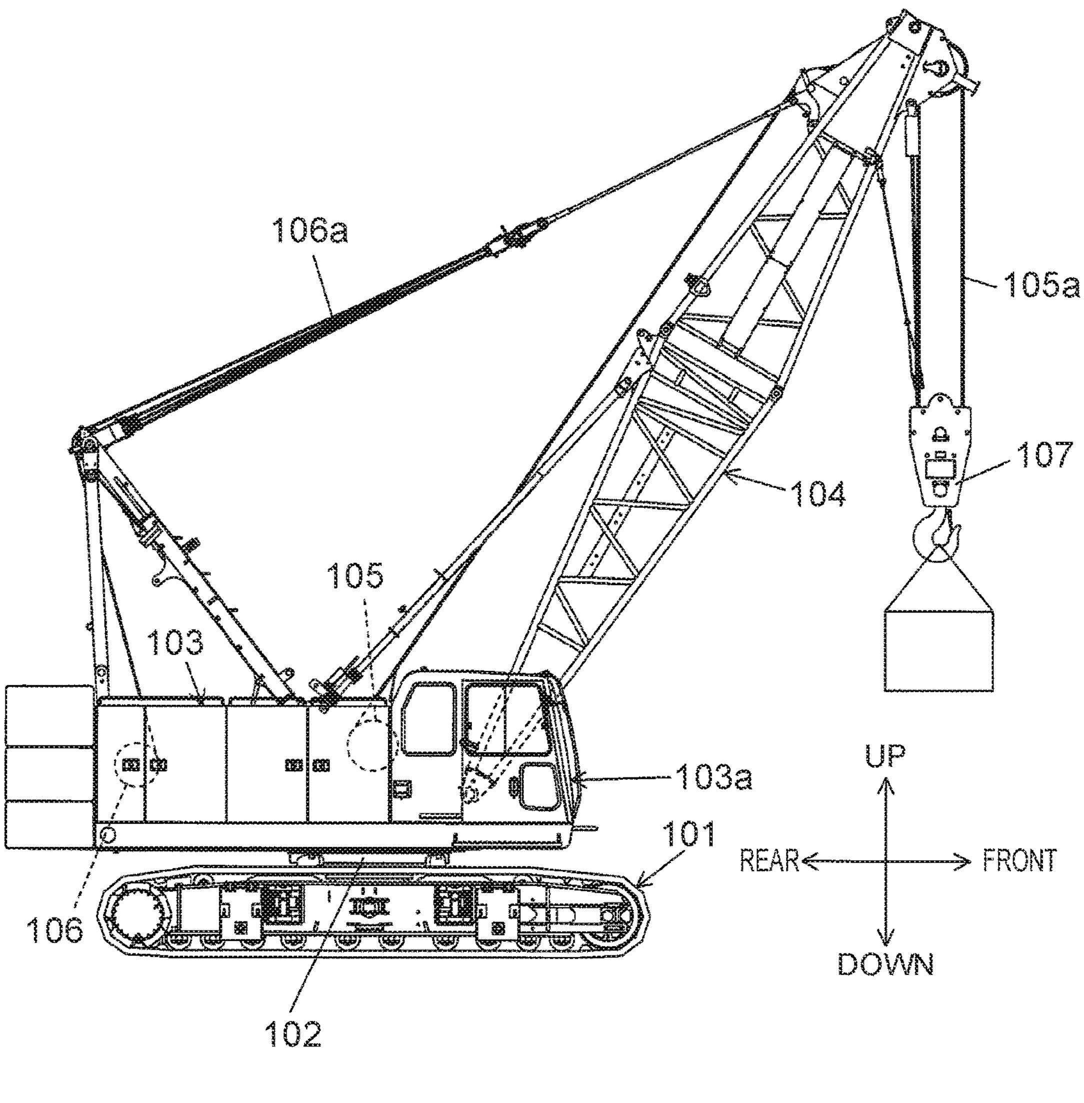
FIG. 1 is an external side view of a crane in accordance with embodiments of the present invention.

Embodiments of a crane in accordance with the present invention will now be described with reference to the accompanying drawings. FIG. 1 is an external side view of the crane in accordance with the embodiments. The crane includes a travel base 101, an upperstructure 103 and a boom 104 rotatably attached to the upperstructure 103 that is installed on a frame foaming part of the travel base 101 through a swing wheel 102.

The upperstructure 103 is provided with a cab 103*a*, and equipped with a hoisting drum 105 and a derrick drum 106. In the cab 130*a*, various types of operating devices are provided such as a display 19 configured with a LCD and/or the like (see FIG. 2), a swing motor brake switch 12 (see FIG. 2), a swing control device 9 (see FIG. 2) and the like. A hoisting rope 105*a* is wound on the hoisting drum 105. As the hoisting drum 105 is driven, the hoisting rope 105*a* is wound up/unwound to lift/lower a hook 107. A derrick rope 106*a* is wound on the derrick drum 106. As the derrick drum 106 is driven, the derrick rope 106*a* is wound up/unwound to raise/lower a boom 104.

Figure 2:
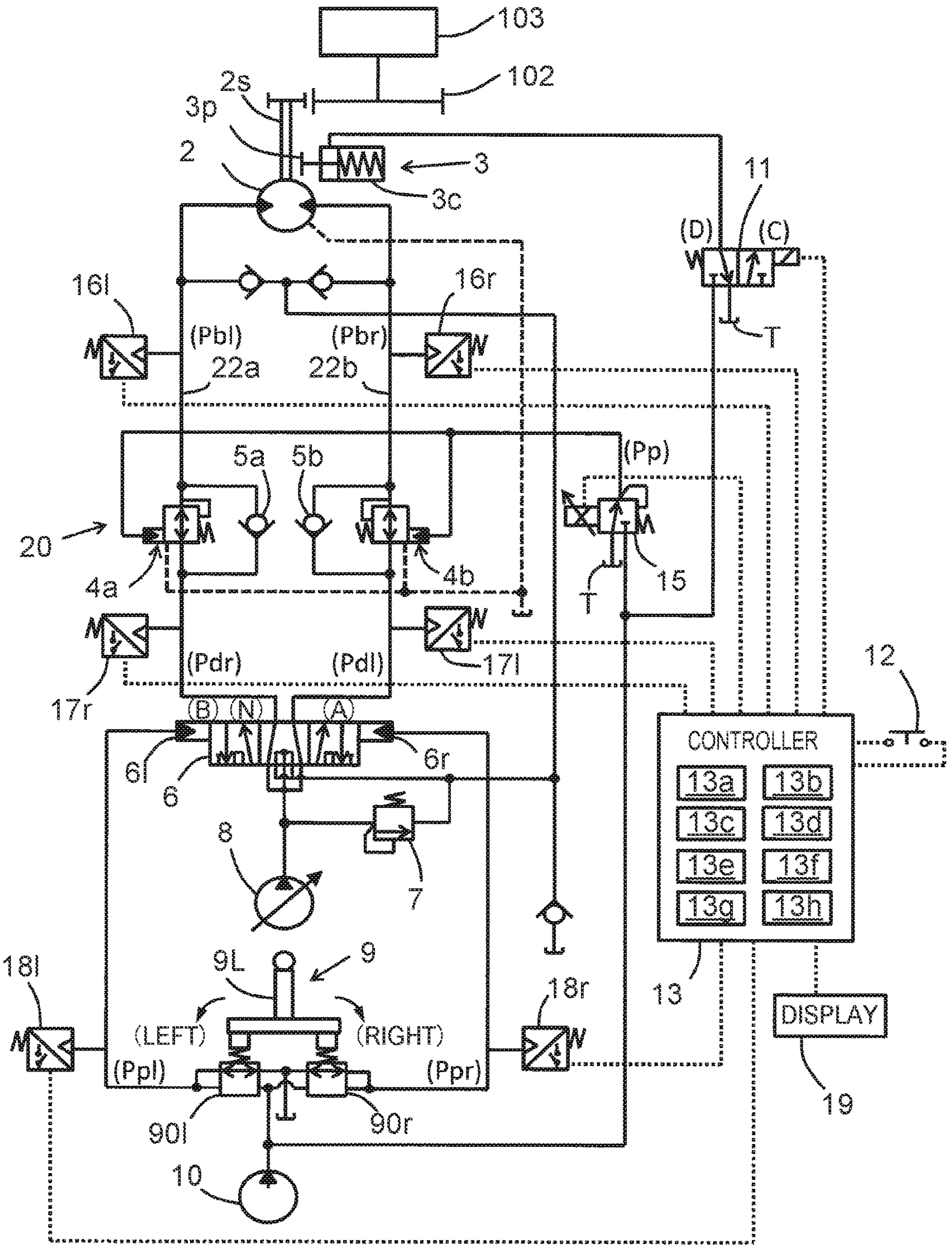
FIG. 2 is a schematic diagram of a hydraulic circuit to drive a swing hydraulic motor of a crane in accordance with a first embodiment.

The swing wheel 102 is driven by a swing hydraulic motor 2 (see FIG. 2). The hoisting drum 105 is driven by a hoisting hydraulic motor (not shown), and the derrick drum 106 is driven by a derrick hydraulic motor (not shown). The rotation of each of the hydraulic motors can be braked by a braking device. The following is a description, in particular, of a braking device for the swing hydraulic motor.

FIG. 2 is a diagram illustrating a hydraulic circuit to drive the swing hydraulic motor. The hydraulic circuit is a neutral free swing hydraulic circuit in which a swing hydraulic pump (hereinafter simply referred to as a "hydraulic pump 8") and a swing hydraulic motor (hereinafter simply referred to as a "hydraulic motor 2") are connected through a directional control valve 6 having a neutral free position (N). The hydraulic circuit includes the hydraulic pump 8, the hydraulic motor 2, a swing brake device 20 and the swing motor brake 3, and a relief valve 7. The hydraulic pump 8 is of a variable displacement type in which a displacement (the amount of discharge per pump revolution) is changed by a pump regulator (not shown) driven by an engine (not shown). The hydraulic motor 2 is rotated by pressure oil discharged from the hydraulic pump 8 to drive a rotational motion of the upperstructure 103. The swing brake device 20 and the swing motor brake 3 apply brakes on the rotation of the hydraulic motor 2. The relief valve 7 provides a maximum pressure for the pressure oil discharged from the hydraulic pump 8. The hydraulic circuit further includes a directional control valve 6 for control of the flow of pressure oil from the hydraulic pump 8 to the hydraulic motor 2, a pilot pump 10 driven by the engine (not shown), and a swing control device 9.

The swing control device 9 includes a control lever for a swing instruction (hereinafter referred to as a "swing lever 9L"), and pilot valves 90*r*, 901 connected to the pilot pump 10. The swing control device 9 uses the pilot valves 90*r*, 901 to generate an operation pilot pressure to instruct the swing motion of the upperstructure 103, on the basis of an operated direction of the swing lever 9L and a manipulated variable of the swing lever 9L. Then, the swing control device 9 outputs the generated operation pilot pressure to a pilot pressure input ends 6*r*, 61 of the directional control valve 6, thus controlling the directional control valve 6 for swing operation of the upperstructure 103.

The pilot valves 90*r*, 90*l* are supplied with pilot pressure oil from the pilot pump 10, and generate a secondary pressure, i.e., an operation pilot pressures Ppl, Ppr (swing drive instruction signal) based on a manipulated variable of the swing lever 9L. The pilot valves 90*r*, 90*l* then output the operation pilot pressures Ppr, Ppl to the pilot pressure input ends 6*r*, 61 of the directional control valve 6. The pilot valves 90*r*, 901 increase the operation pilot pressures Ppr, Ppl with an increase in manipulated variable of the swing lever 9L.

The directional control valve 6 is a control valve having a neutral free position (N), which is inserted in the oil passage between the hydraulic pump 8 and the hydraulic motor 2 to control the flow of pressure oil from the hydraulic pump 8 to the hydraulic motor 2. The spool position of the directional control valve 6 is controlled by the operation pilot pressures Ppr, Ppl input to the pilot pressure input ends 6*r*, 6*l*.

The hydraulic motor 2 is connected to passages 22*a*, 22*b* to which the pressure oil discharged from the hydraulic pump 8 is supplied through the directional control valve 6. The torque of the hydraulic motor 2 is transferred to the swing wheel 102 through a planetary reduction mechanism (not shown).

When the operator manipulates the swing lever 9L for right swing, the right operation pilot pressure Ppr is output from the pilot valve 90*r* to act on the pilot pressure input end 6*r* of the directional control valve 6, shifting the directional control valve 6 into the right swing position (A). Thus, the pressure oil discharged from the hydraulic pump 8 is supplied to the hydraulic motor 2 through the passage 22*a*, so that the hydraulic motor 2 rotates in one direction (forward rotation). Upon the hydraulic motor 2 being driven for forward rotation, the upperstructure 103 is swung to right.

When the operator manipulates the swing lever 9L for left swing, the left operation pilot pressure Ppl is output from the pilot valve 901 to act on the pilot pressure input end 61 of the directional control valve 6, shifting the directional control valve 6 into the left swing position (B). Thus, the pressure oil discharged from the hydraulic pump 8 is supplied to the hydraulic motor 2 through the passage 22*b*, so that the hydraulic motor 2 rotates in the other direction (reverse rotation). Upon the hydraulic motor 2 being driven for reverse rotation, the upperstructure 103 is swung to left.

When the operator moves the swing lever 9L from the right or left swing manipulated position back to the neutral position, the pressure acting on the pilot pressure input end 6*r*/6*l* becomes a tank pressure, shifting the directional control valve 6 into the neutral free position (N). Upon the direction control valve 6 shifting into the neutral free position (N), this brings about a communication state between the passage 22*a* and the passage 22*b*, which in turn brings the hydraulic motor 2 to a state in which the hydraulic motor 2 can rotate under external force. In short, the upperstructure 103 comes into a free state in which the upperstructure 103 is rotatable by inertia. This state is also referred to as "neutral free". During the neutral free, the swing brake device 20 and/or the swing motor brake 3 is actuated to generate a braking force applied to the upperstructure 103 in order to stop the swing motion of the upperstructure 103.

The swing motor brake 3 includes a hydraulic cylinder and a solenoid selector valve 11. The hydraulic cylinder (hereinafter referred to as the "brake release cylinder 3*c*") has a pad 3*p* to be pressed against a swing brake disc (not shown) mounted on the output shaft 2*s* of the hydraulic motor 2. The solenoid selector valve 11 controls the flow of pressure oil supplied from the pilot pump 10 to the brake release cylinder 3*c*.

The swing motor brake 3 is so-called a negative brake. When the brake release cylinder 3*c* is in communication with the tank T, the pad 3*p* is pressed against the swing brake disc (not shown) by a spring force, so that the swing motor brake 3 is actuated to generate a braking force for the upperstructure 103. Upon action of a release pressure on the brake release cylinder 3*c*, the swing motor brake 3 is released. When the ongoing operation of the swing motor brake 3 is released, a gap is created between the swing brake disc (not shown) and the pad 3*p*, so that no braking force to be applied to the upperstructure 103 is generated.

The solenoid selector valve 11 is installed between the pilot pump 10 and the brake release cylinder 3*c*. The solenoid selector valve 11 is a solenoid selector valve that, when being in the release position (C), permits pressure oil to flow from the pilot pump 10 to the brake release cylinder 3*c*, but, when being in the operative position (D), prohibits pressure oil from flowing from the pilot pump 10 to the brake release cylinder 3*c*. When the solenoid selector valve 11 is turned to the operative position (D), the brake release cylinder 3*c* and the tank T are in communication, so that the pressure in an oil chamber of the brake release cylinder 3*c* becomes a tank pressure.

The solenoid selector valve 11 is switched into the release position (C) or the operative position (D) in response to a control signal from a controller 13. Upon detection that the swing motor brake switch 12 mounted in the cab 103*a* is operated to the brake release position, the controller 13 energizes a solenoid of the solenoid selector valve 11 to switch the solenoid selector valve 11 to the release position (C). As a result, the pilot pressure oil discharged from the pilot pump 10 is supplied to the brake release cylinder 3*c* of the hydraulic motor 2, so that the swing motor brake 3 is released to make the upperstructure 103 rotatable.

Upon detection that the swing motor brake switch 12 is operated to the brake actuation position, the controller 13 de-energizes the solenoid of the solenoid selector valve 11 to switch the solenoid selector valve 11 to the operative position (D). This blocks the supply of the pilot pressure oil from the pilot pump 10 to the brake release cylinder 3*c* to establish communication between the brake release cylinder 3*c* and the tank T, so that the swing motor brake 3 is actuated to prohibit the upperstructure 103 from swinging.

The swing brake device 20 has brake control valves 4*a*, 4*b*, check valves 5*a*, 5*b*, the controller 13 and a solenoid proportional pressure reducing valve 15. The solenoid proportional pressure reducing valve 15 is installed between the pilot pump 10 and the brake control valves 4*a*, 4*b*. The solenoid proportional pressure reducing valve 15 is supplied with pilot pressure oil from the pilot pump 10 and generates a secondary pressure, that is, a pilot pressure Pp (drive instruction signal) based on a control signal from the controller 13, which is then output to pilot ports of the brake control valves 4*a*, 4*b*.

The decompression degree of the solenoid proportional pressure reducing valve 15 is controlled by a control electric current I from the controller 13. The valve characteristics (opening characteristics) of the solenoid proportional pressure reducing valve 15 is set to reduce the degree decompression with an increase in the control electric current I input to the solenoid, that is, to increase the secondary pressure (pilot pressure) with an increase in the control electric current I.

When the control electric current I output from the controller 13 is a maximum current Imax, the pilot pressure oil discharged from the pilot pump 10 acts on the pilot ports of the brake control valves 4*a*, 4*b* without being reduced in pressure. When the control electric current I output from the controller 13 is a minimum current Imin (e.g., Imin=zero), the solenoid proportional pressure reducing valve 15 is in the full closed position, the pilot pump 10 and the brake control valves 4*a*, 4*b* are disconnected by the solenoid proportional pressure reducing valve 15. At this time, since the pilot ports of the brake control valves 4*a*, 4*b* are connected to the tank T through the solenoid proportional pressure reducing valve 15, the tank pressure acts on the pilot ports of the brake control valves 4*a*, 4*b*. Incidentally, the magnitude relationship between the minimum current Imin and the maximum current Imax is Imin<Imax.

The brake control valve 4*a* and the brake control valve 4*b* form a flow restrictor that limits oil on the return side of the hydraulic motor 2 which is one of the passage 22*a* connected to one port of the hydraulic motor 2 and the passage 22*b* connected to the other port of the hydraulic motor 2. The brake control valves 4*a*, 4*b* are pressure reducing valves which are inserted respectively in the passages 22*a*, 22*b* between the hydraulic motor 2 and the directional control valve 6 to control the pressure and the flow rate of the pressure oil on the return side of the hydraulic motor 2. The brake control valves 4*a*, 4*b* are driven based on a pilot pressure Pp generated by the solenoid proportional pressure reducing valve 15 and on a pressure of the return side of the hydraulic motor 2 and a spring bias force. As the pilot pressure Pp generated by the solenoid proportional pressure reducing valve 15 rises, the brake control valves 4*a*, 4*b* throttle the passages 22*a*, 22*b* which are passages of the return side of the hydraulic motor 2, so as to the pressure of the pressure oil of the return side of the hydraulic motor 2, thus generating a braking force (hydraulic braking force) to be applied to the hydraulic motor 2. The brake control valves 4*a*, 4*b* are configured to reduce the flow passage area of the return side of the hydraulic motor 2 in accordance with an increase in the input pilot pressure Pp, and the set pressure of the brake control valves 4*a*, 4*b* increases with an increase in the pilot pressure Pp. An increase in pressure of the returning pressure oil increases a braking force acting on the hydraulic motor 2 (i.e., braking force to be applied to the upperstructure 103), the rotation of the hydraulic motor 2 is limited.

The check valves 5*a*, 5*b* are non-return valves inserted respectively in the passages 22*a*, 22*b* in parallel with the brake control valves 4*a*, 4*b*.

The controller 13 includes CPU, storage devices such as ROM, RAM and the like, and a processor controller having other peripheral circuits in order to perform control on each component of the crane. The controller 13 is connected to a right swing operation pressure sensor 18*r*, left swing operation pressure sensor 181, right backpressure sensor 16*r*, left backpressure 16*l*, right outlet pressure sensor 17*r*, left outlet pressure sensor 17*l*, solenoid selector valve 11, solenoid proportional pressure reducing valve 15, display 19 and the swing motor brake switch 12.

The right and left swing operation pressure sensors 18*r*, 181 respectively detect the operation pilot pressures Ppr, Ppl generated in the pilot valves 90*r*, 901 in accordance with the manipulated variable of the swing lever 9L (the angle of rotation of the lever), and then output the detected signals to the controller 13. The controller 13 detects the manipulated variable of the swing lever 9L based on the signals output from the right swing operation pressure sensor 18*r* and the left swing operation pressure sensor 18*l*.

The left backpressure sensor 16*l* detects a pressure in the passage 22*a* between one port of the hydraulic motor 2 and the brake control valve 4*a* (hereafter referred to as a "left motor backpressure Pb1"), and then outputs the detected signal to the controller 13. The right backpressure sensor 16*r* detects a pressure in the passage 22*b* between the other port of the hydraulic motor 2 and the brake control valve 4*b* (hereafter referred to as a "right motor backpressure Pbr"), and then outputs the detected signal to the controller 13. The controller 13 detects a right motor backpressure Pbr and the left motor backpressure Pbl based on the signals output from the right backpressure sensor 16*r* and the left backpressure sensor 16*l*.

The right outlet pressure sensor 17*r* detects a pressure in the passage 22*a* between the brake control valve 4*a* and the directional control valve 6 (hereinafter referred to as a "right outlet pressure Pdr"), and then outputs the detected signal to the controller 13. The left outlet pressure sensor 17*l* detects a pressure in the passage 22*b* between the brake control valve 4*b* and the directional control valve 6 (hereinafter referred to as a "left outlet pressure Pdl"), and then outputs the detected signal to the controller 13. The controller 13 detects a right outlet pressure Pdr and a left outlet pressure Pdl based on the signals output from the right outlet pressure sensor 17*r* and the left outlet pressure sensor 17*l*.

The display 19 has a display screen to display a display image based on the control signals from the controller 13. The swing motor brake switch 12 is a manipulation member for manipulating the swing motor brake 3.

The controller 13 functionally has a motor brake operating determination unit 13*a*, external-force direction estimation unit 13*b*, external-force decision unit 13*c*, swing operation determination unit 13*d*, direction determination unit 13*e*, drive pressure decision unit 13*f*, brake control unit 13*g*, and a display control unit 13*h*.

The motor brake operating determination unit 13*a* determines, based on a manipulated position of the swing motor brake switch 12, whether or not the swing motor brake 3 is under operating conditions. If the swing motor brake switch 12 is turned to the brake actuation position, the motor brake operating determination unit 13*a* determines that the swing motor brake 3 is in the operating state of generating a braking force. If the swing motor brake switch 12 is turned to the brake release position, the motor brake operating determination unit 13*a* determines that the swing motor brake 3 is in the release state of generating no braking force.

The external-force direction estimation unit 13*b* performs a comparison between the right motor backpressure Pbr detected by the right backpressure sensor 16*r* and the left motor backpressure Pbl detected by the left backpressure sensor 16*l*. If the right motor backpressure Pbr is higher than the left motor backpressure Pb1, the external-force direction estimation unit 13*b* estimates that the revolving direction of the upperstructure 103 under an external force acting on the upperstructure 103 is the right direction. If the left motor backpressure Pbl is higher than the right motor backpressure Pbr, the external-force direction estimation unit 13*b* estimates that the revolving direction of the upperstructure 103 under an external force acting on the upperstructure 103 is the left direction. The swing direction of the upperstructure 103 under an external force refers to a direction in which the upperstructure 103 is rotated by an external force if the swing motor brake 3 and the swing brake device 20 are released while the swing lever 9L is held in the neutral position.

If the right motor backpressure Pbr and the left motor backpressure Pbl are equal, the external-force direction estimation unit 13*b* estimates that no external force occurs. It should be noted that, regardless of the magnitude relationship between the right motor backpressure Pbr and the left motor backpressure Pbl, if an absolute value of a difference between the right motor backpressure Pbr and the left motor backpressure Pbl is within a predetermined value, it may be estimated that no external force occurs.

The external-force decision unit 13*c* decides the higher pressure of the two right and left motor backpressures Pbr and Pbl as a holding pressure Ph representative of the magnitude of the external force acting on the upperstructure 103 during the ongoing operation of the swing brake device 20.

The swing operation determination unit 13*d* determines, based on the operation pilot pressures ppr, Ppl detected by the right and left swing operation pressure sensors 18*r* and 18*l*, whether or not the upperstructure 103 is instructed to swing through the swing control device 9. If each of the operation pilot pressures ppr, Ppl detected by the right and left swing operation pressure sensors 18*r* and 18*l* is less than a threshold value Pp0, the swing operation determination unit 13*d* determines that the swing lever 9L is in the neutral position and provides no instruction to swing the upperstructure 103. The threshold value Pp0 is used to make a determination whether or not the upperstructure 103 is instructed to swing, which is previously stored in a storage device of the controller 13.

If the right operation pilot pressure Ppr detected by the right swing operation pressure sensor 18*r* is equal to or higher than the threshold value Pp0, the swing operation determination unit 13*d* determines that swing operation is instructed and the direction of swing is the right direction. If the left operation pilot pressure Ppl detected by the left swing operation pressure sensor 18*l* is equal to or higher than the threshold value Pp0, the swing operation determination unit 13*d* determines that swing operation is instructed and the direction of swing is the left direction.

The direction determination unit 13*e* determines, based on the result determined by the swing operation determination unit 13*d* and the result estimated by the external-force direction estimation unit 13*b*, whether the direction of swing operation by the swing control device 9 and the swing direction of the upperstructure 103 under an external force acting on the upperstructure 103 are the same or opposite.

The direction determination unit 13*e* determines, in the following the cases (i) and (ii), that the swing direction of swing operation by the swing control device 9 and the swing direction of the upperstructure 103 under an external force acting on the upperstructure 103 are the same direction.

The case (i): the swing operation determination unit 13*d* has determined that the swing operation is performed in the right direction and also the external-force direction estimation unit 13*b* has estimated that the rotation direction is the right direction.

The case (ii): the swing operation determination unit 13*d* has determined that the swing operation is performed in the left direction and also the external-force direction estimation unit 13*b* has estimated that the rotation direction is the left direction.

The direction determination unit 13*e* determines, in the following the cases (iii) and (iv), that the swing direction of swing operation by the swing control device 9 and the swing direction of the upperstructure 103 under an external force acting on the upperstructure 103 are the opposite directions.

The case (iii): the swing operation determination unit 13*d* has determined that the swing operation is performed in the right direction and also the external-force direction estimation unit 13*b* has estimated that the rotation direction is the left direction.

The case (iv): the swing operation determination unit 13*d* has determined that the swing operation is performed in the left direction and also the external-force direction estimation unit 13*b* has estimated that the rotation direction is the right direction.

The drive pressure decision unit 13*f* decides the higher pressure of the two right and left outlet pressures Pdr and Pdl as a drive pressure Pd.

When the following (condition 0) are met, the brake control unit 13*g* determines that the brake actuation conditions are met. Upon meeting the brake actuation conditions, the brake control unit 13*g* sets the control electric current I supplied to the solenoid proportional pressure reducing valve 15 to be a maximum current Imax. This causes the solenoid of the solenoid proportional pressure reducing valve 15 to be energized, so that the hydraulic brake caused by the brake control valve 4*a*, 4*b* comes into the operating state.

(Condition 0) it is determined by the motor brake operating determination unit 13*a* that the swing motor brake 3 is in the operating state.

When all the following (condition 1.1) to (condition 1.3) are met or when all the following (condition 2.1) and (condition 2.2) are met, the brake control unit 13*g* determines that the brake release conditions are met. Upon meeting the brake release conditions, the brake control unit 13*g* sets the control electric current I supplied to the solenoid proportional pressure reducing valve 15 to be a minimum current Imin. This causes the solenoid of the solenoid proportional pressure reducing valve 15 to be de-energized, so that the hydraulic brake caused by the brake control valve 4*a*, 4*b* comes into the release state.

(Condition 1.1) it is determined by the motor brake operating determination unit 13*a* that the swing motor brake 3 is in the release state.

(Condition 1.2) it is determined by the direction determination unit 13*e* that the direction of swing operation by the swing control device 9 and the swing direction of the upperstructure 103 under an external force acting on the upperstructure 103 are the opposite directions.

(Condition 1.3) the drive pressure Pd is higher than the holding pressure Ph.

(Condition 2.1) it is determined by the motor brake operating determination unit 13*a* that the swing motor brake 3 is in the release state.

(Condition 2.2) it is determined by the direction determination unit 13*e* that the direction of swing operation by the swing control device 9 and the swing direction of the upperstructure 103 under an external force acting on the upperstructure 103 are the same direction.

When any of (condition 1.1), (condition 1.2), (condition 1.3), (condition 2.1) and (condition 2.2) is/are not met, the brake control unit 13*g* determines that the brake release conditions are not met. If the determination that the brake release conditions are not met is made during the ongoing operation of the swing brake device 20, the brake control unit 13*g* maintains the control electric current I supplied to the solenoid proportional pressure reducing valve 15 at the maximum current Imax without any change in order to maintain the operating state of the hydraulic brake caused by the brake control valves 4*a*, 4*b*.

When the swing brake device 20 is in the operating state, the brake control unit 13*g* sets a swing brake operating flag, and when the swing brake device 20 is in the release state, the brake control unit 13*g* clears the swing brake operating flag. When the swing brake operating flag is on, the brake control unit 13*g* determines whether or not the above-described brake release conditions are met, and when the swing brake operation flag is off, the brake control unit 13*g* determines whether or not the above-described brake actuation conditions are met.

When the determination that the swing motor brake 3 is in the operating state is made by the motor brake operating determination unit 13*a*, the display control unit 13*h* outputs a control signal to the display 19 in order for a display image showing that the swing motor brake 3 is in the operating state to be displayed on the display screen of the display 19. When the determination that the swing motor brake 3 is in the release state is made by the motor brake operating determination unit 13*a*, the display control unit 13*h* outputs a control signal to the display 19 in order for a display image showing that the swing motor brake 3 is in the release state to be displayed on the display screen of the display 19.

The display control unit 13*h* outputs a control signal to the display 19 to cause the display 19 to display the swing direction of the upperstructure 103 estimated by the external-force direction estimation unit 13*b* and the holding pressure Ph representing the magnitude of the external force decided by the external-force decision unit 13*c* when the swing brake device 20 is operating.

Figure 3:
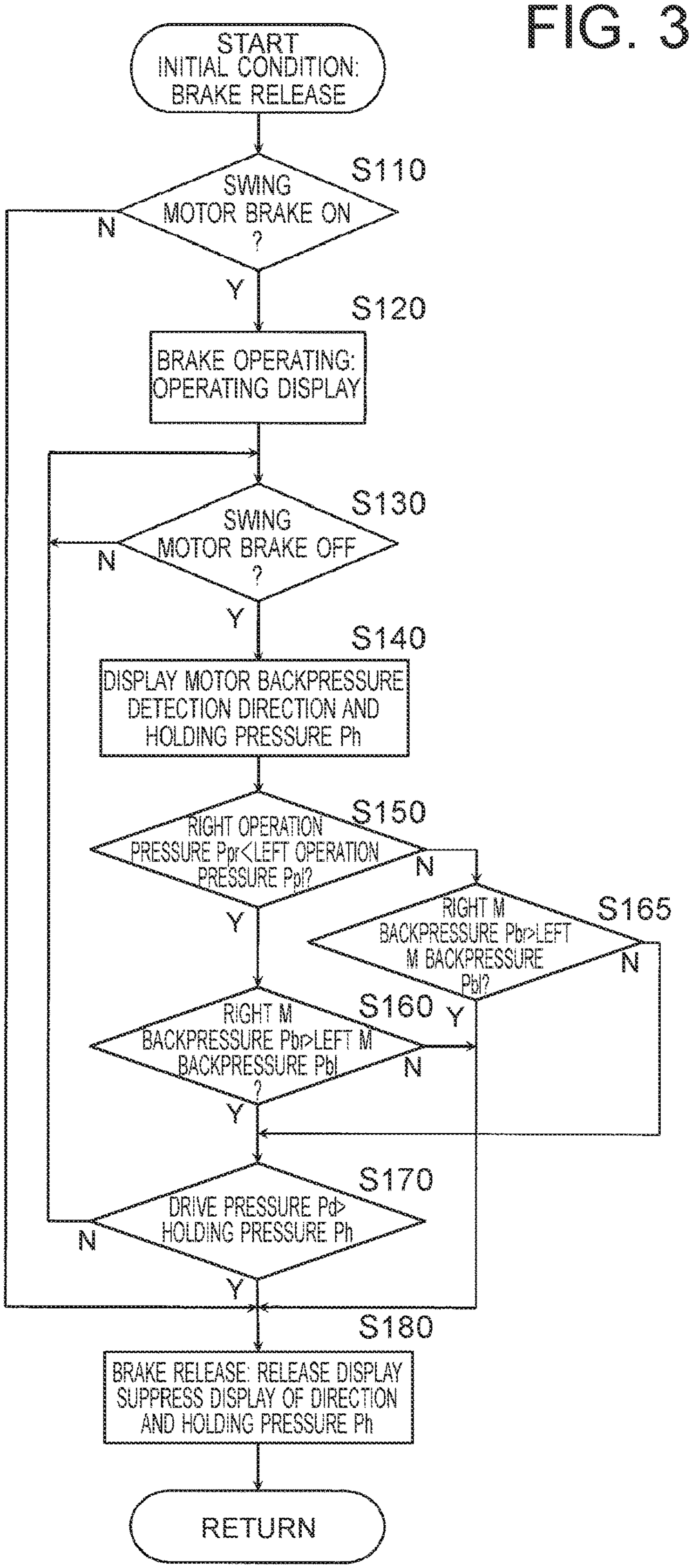
FIG. 3 is a flowchart illustrating example processing of a control program executed by a controller of the crane in accordance with the first embodiment.

FIG. 3 is a flowchart illustrating an example of control program processing executed by the controller 13. The processing illustrated in the flowchart in FIG. 3 corresponds to the processing steps after the swing brake device 20 has been released. The processing illustrated in the flowchart in FIG. 3 is repeated in a predetermined control cycle. Although not shown, the controller 13 acquires intonation in a predetermined control cycle from various sensors including the right swing operation pressure sensor 18*r*, the left swing operation pressure sensor 181, right backpressure sensor 16*r*, left backpressure sensor 16*l*, right outlet pressure sensor 17*r*, and the left outlet pressure sensor 17*l*.

As illustrated in FIG. 3, at step S110, the controller 13 determines, based on the manipulated position of the swing motor brake switch 12, whether or not the swing motor brake 3 is under operating conditions. If an affirmative determination is made in step S110, that is, if the swing motor brake 3 is under operating conditions, the flow advances to step S120. If a negative determination is made in step S110, the flow advances to step S180.

At step S120, the controller 13 actuates the swing brake device 20 by setting the control electric current I for the solenoid proportional pressure reducing valve 15 to be the maximum current Imax, and then causes the display 19 to display, on the display screen, a display image showing that the swing brake device 20 is in the operating state, and the flow advances to step S130.

At step S130, the controller 13 determines whether or not the swing motor brake 3 is released. The controller 13 repeats the process in step S130 until an affirmative determination is made. Upon affirmative determination, that is, upon determination being made that the swing motor brake 3 is released, the flow advances to step S140.

At step S140, the controller 13 estimates a revolving direction of the revolving upperstructure 103 based on the right motor backpressure Pbr and the left motor backpressure Pbl, and causes the display 19 to display, on the display screen, a display image showing the estimated rotation direction. In step S140, the controller 13 determines a holding pressure Ph representing the magnitude of an external force, and causes the display 19 to display a display image of the holding pressure Ph on the display screen, and the flow advances to step S150.

At step S150, the controller 13 determines whether or not the right operation pilot pressure Ppr is less than the left operation pilot pressure Ppl. If an affirmative determination is made in step S150, the flow advances to step S160, but if a negative determination is made in step S150, the flow advances to step S165.

At step S160, the controller 13 determines whether or not the right motor backpressure Pbr is higher than the left motor backpressure Pbl. If an affirmative determination is made in step S160, the flow advances to step S170, but if a negative determination is made in step S160, the flow advances to step S180.

At step S165, the controller 13 determines whether or not the right motor backpressure Pbr is higher than the left motor backpressure Pbl. If an affirmative determination is made in step S165, the flow advances to step S180, but if a negative determination is made in step S165, the flow advances to step S170.

At step S170, the controller 13 selects the higher one of the two right and left outlet pressures Pdr and Pdl as a drive pressure Pd, and then determines whether or not the drive pressure Pd is higher than the holding pressure Ph. If an affirmative determination is made in step S170, the flow advances to step S180, but if a negative determination is made in step S170, the flow returns to step S130.

At step S180, the controller 13 releases the swing brake device 20 by setting the control electric current I for the solenoid proportional pressure reducing valve 15 to be the minimum current Imin. Then, the controller 13 causes the display 19 to display, on the display screen, a display image showing that the swing brake device 20 is in the release state, in placement of the display image showing that the swing brake device 20 is in the operating state which has been displayed in step S120. At step S180, the controller 13 suppresses the display of the display image of the swing direction of the upperstructure 103 and the display image of the holding pressure Ph which have been displayed in step S140. Then, the flow in the flowchart of FIG. 3 is terminated, that is, the flow returns to the processing in step S110.

Principal operation of the crane in accordance with the embodiment is described. The operator manipulates the swing motor brake switch 12 to the actuation position, whereupon the swing motor brake 3 and the swing brake device 20 are actuated. When the operator manipulates the swing motor brake switch 12 to the release position, the swing motor brake 3 is released, but the operating of the swing brake device 20 is maintained.

Here, if an external force such as of strong winds acts on the upperstructure 103, the swing direction of the upperstructure 103 under the external force and the holding pressure Ph representing the magnitude of the external force are displayed on the display screen of the display 19 (S140 in FIG. 3). This makes it possible for the operator before manipulating the crane to be aware of the swing direction of the upperstructure 103 under the external force, that is, the direction of the upperstructure 103 being swayed, and the magnitude of the external force.

For example, when the operator wants to swing the upperstructure 103 to the left, if the swing direction of the upperstructure 103 under the external force is the left direction, the operator can find beforehand that the upperstructure 103 will be swung to the left by manipulating the swing lever 9L to the left to release the ongoing operation of the swing brake device 20 immediately followed by manipulating the swing lever 9L back to the neutral position.

When the operator wants to swing the upperstructure 103 to the right, if the swing direction of the upperstructure 103 under the external force is the left direction, the operator can find beforehand that the ongoing operation of the swing brake device 20 will be released by manipulating the swing lever 9L to the right to increase gradually the manipulated variables. In addition, since the magnitude of the external force is displayed on the display screen of the display 19, the operator can find what manipulated variable is required to release the swing brake device 20.

The operator sees the display image displayed on the display screen of the display 19 to decide what course of manipulation action, and then performs manipulation as follows, by way of example.

In the situation where an external force of strong winds acts on the upperstructure 103 to make it swing to the right, when the operator manipulates the upperstructure 103 to swing to the right, the ongoing operation of the swing brake device 20 is released, so that the upperstructure 103 swings to the right (in FIG. 3, S150,N→S165→S180). The display screen of the display 19 can make the operator aware that the swing brake device 20 is released (S180 in FIG. 3). The operator checks the release of the swing brake device 20 and then moves the swing lever 9L back to the neutral position. Upon the operator moving the swing lever 9L back to the neutral position, the upperstructure 103 swings to the right by the external force of strong winds. To stop the right swing of the upperstructure 103, the operator may manipulate the swing lever 9L to the left.

In the situation where an external force of strong winds acts on the upperstructure 103 to make it swing to the right, when the operator manipulates the upperstructure 103 to swing to the left, if the lever manipulated variable is small and therefore the drive pressure Ph is lower than the holding pressure Ph, the operating state of the swing brake device 20 is maintained (in FIG. 3, S150,Y→S160,Y→S170,N). The operator gradually increases the lever manipulated variable, and thus the drive pressure Pd exceeds the holding pressure Ph. Thereupon, the ongoing operation of the swing brake device 20 is released, and the pressure oil discharged from the hydraulic pump 8 is supplied to the other port of the hydraulic motor 2, thus swinging the revolving upperstructure 103 to the left (in FIG. 3, S150,Y→S160,Y→S170, Y→S180).

According to the above-described embodiment, the following advantageous effects can be provided.

(1) The crane in accordance with the embodiment includes the hydraulic circuit in which the hydraulic pump 8 and the hydraulic motor 2 are connected through the directional control valve 6 having the neutral free position. The crane includes the display 19 serving as a notification device controlled by the controller 13. The controller 13 estimates the swing direction of the upperstructure 103 under an external force acting on the upperstructure 103 on the basis of the right motor backpressure Pb and the left motor backpressure Pbl in the operating state of the swing brake device 20, and then the controller 13 causes the display 19 to provide notification of the estimated swing direction of the upperstructure 103.

This makes it possible for the operator prior to commencing the swing manipulation to know the swing direction of the upperstructure 103 under the external force, that is, the direction in which the upperstructure 103 is swayed by the external force. Because of this, the operator can beforehand decide what course of manipulation action in contemplation of the direction of the external force, resulting in appropriate manipulation of the swing control device 9.

(2) The controller 13 causes the display 19 to provide notification of the holding pressure Ph representing the magnitude of the external force acting on the upperstructure 103. As a result, the operator can know beforehand the magnitude of the external force, making it possible to adjust the manipulated variable of the swing lever 9L in accordance with the magnitude of the external force. Smooth swinging is started.

(3) The controller 13 determines whether the direction of swing operation by the swing control device 9 and the swing direction of the upperstructure 103 under the external force acting on the upperstructure 103 are the same or opposite. If the controller 13 has determined that the direction of swing operation by the swing control device 9 and the swing direction of the upperstructure 103 under the external force acting on the upperstructure 103 are opposite in the operating state of the swing brake device 20, the controller 13 maintains the operating state of the swing brake device 20 when the drive pressure Pd is lower than the higher one of the two right and left motor backpressures Pbr and Pbl, that is, than the holding pressure Ph. If the controller 13 has determined that the direction of swing operation by the swing control device 9 and the swing direction of the upperstructure 103 under the external force acting on the upperstructure 103 are opposite in the operating state of the swing brake device 20, the controller 13 releases the operating state of the swing brake device 20 when the drive pressure Pd is higher than the holding pressure Ph.

As a result, when the ongoing operation of the swing brake device 20 is released, the upperstructure 103 is prevented from being moved in an unintended direction by the external force acting on the upperstructure 103, so that the upperstructure 103 is able to be swung in the swing manipulated direction against the external force. In the techniques disclosed in Japanese Unexamined Patent Application Publication No. 2009-121500, the swing lever and the brake pedal must be simultaneously manipulated to control the drive force at the time of starting a swing motion. Contrarily, according to the embodiment, manipulating the swing lever 6L achieves automatic release of the swing brake device 20 at the appropriate time, resulting in excellent maneuverability.

(4) If the controller 13 has determined that the direction of swing operation by the swing control device 9 and the swing direction of the upperstructure 103 under the external force acting on the upperstructure 103 are the same direction in the operating state of the swing brake device 20, the controller 13 releases the operating state of the swing brake device 20. Manipulating the swing lever 9L causes the swing brake device 20 to be released, offering good maneuverability. Necessary manipulated variable of the swing lever 9L is small, so that, immediately after releasing the brake, the swing lever 9L can be moved back to the neutral position.

Second Embodiment

Figure 4:
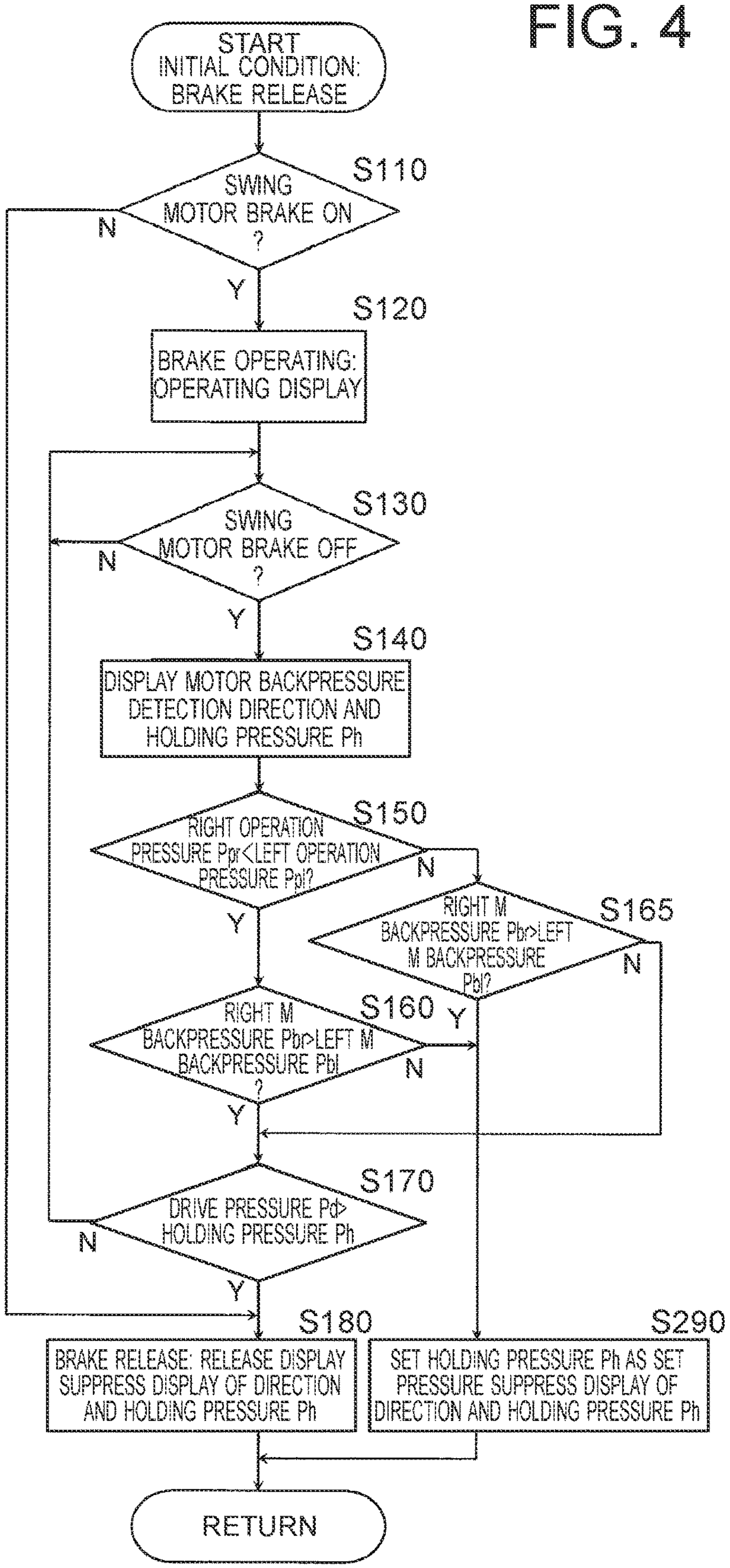
FIG. 4 is a flowchart illustrating example processing of a control program executed by a controller of the crane in accordance with a second embodiment.

A crane in accordance with a second embodiment of the present invention will be described with reference to FIG. 4. In FIG. 4, the same reference signs as those in the first embodiment are used to refer to the same or corresponding elements, and differences will be mainly described. FIG. 4 is, similarly to FIG. 3, a flowchart illustrating an example of control program processing executed by a controller of a crane in accordance with the second embodiment.

FIG. 4 shows a flowchart with step S290 in addition to the flowchart of FIG. 3. After the negative determination is made in step S160 or the affirmative determination is made in step S165, the flow advances to step S290. Specifically, the controller 13 executes the processing in step S290 when the direction of swing operation by the swing control device 9 and the swing direction of the upperstructure 103 under the external force acting on the upperstructure 103 are the same.

At step S290, the controller 13 transmits a control signal to the solenoid proportional pressure reducing valve 15 to set the set pressures of the brake control valves 4*a*, 4*b* to be the holding pressure Ph. At step S290, the controller 13 suppresses the display image showing the swing direction of the upperstructure 103 and the display image of the holding pressure Ph which have been displayed in step S140, and then the processing of the flowchart of FIG. 4 is terminated. That is, the flow returns to the processing in step S110.

In this manner, according to the second embodiment, the following advantageous effects can be produced in addition to the advantageous effects of the first embodiment.

(5) By adjusting the decompression degree of the solenoid proportional pressure reducing valve 15, the set pressures of the brake control valves 4*a*, 4*b* applying a brake to the upperstructure 103 is reduced to the holding pressure Ph. This makes it possible to produce a minimum braking force adequate to prevent the upperstructure 103 from being swung by the external force. In the embodiment, the swing brake device 20 is not released when the swing lever 9L is manipulated in the same direction as the direction of the swing caused by the external force. Instead, a minimum hydraulic braking force against the external force is maintained, so that a sudden swinging operation at the time of starting the upperstructure can be prevented.

Third Embodiment

Figure 5:
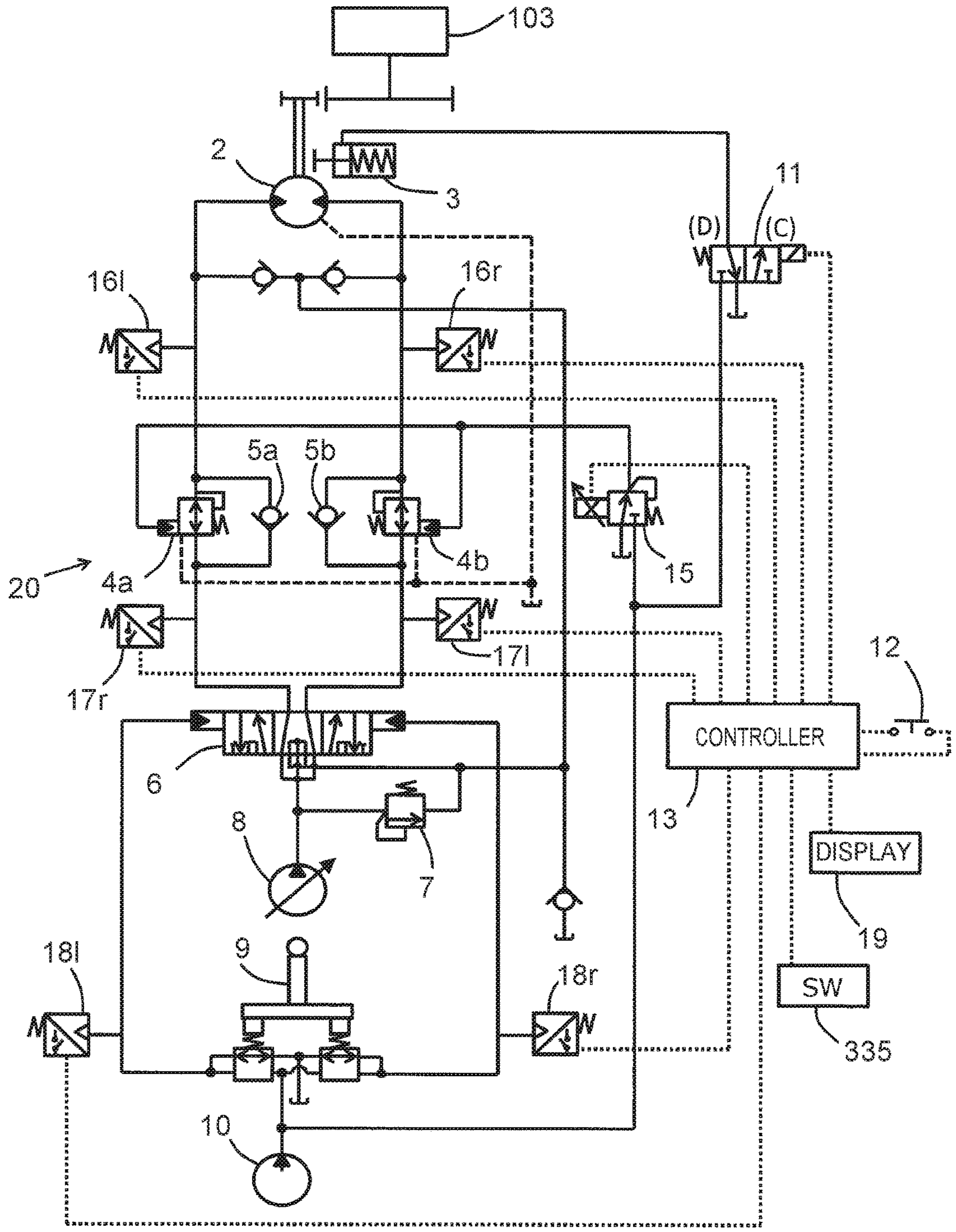
FIG. 5 is a schematic diagram of a hydraulic circuit to drive a swing hydraulic motor of a crane in accordance with a third embodiment.
Figure 6:
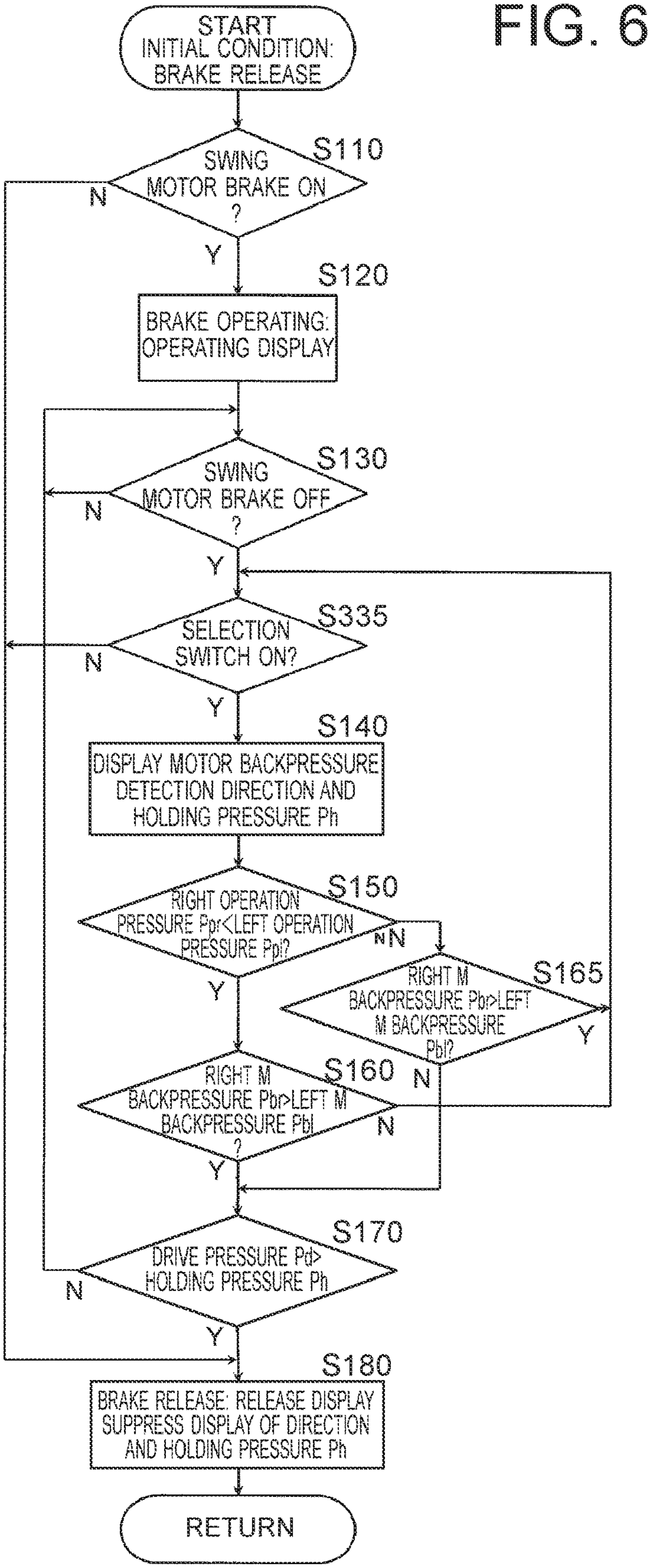
FIG. 6 is a flowchart illustrating example processing of a control program executed by a controller of the crane in accordance with the third embodiment.

A crane in accordance with a third embodiment of the present invention will be described with reference to FIG. 5 and FIG. 6. In FIG. 5 and FIG. 6, the same reference signs as those in the first embodiment are used to refer to the same or corresponding elements, and differences will be mainly described. FIG. 5 is, similarly to FIG. 2, a diagram showing the hydraulic circuit for driving a swing hydraulic motor of a crane in accordance with the third embodiment. FIG. 6 is, similarly to FIG. 3, is a flowchart illustrating an example of control program processing executed by a controller of the crane in accordance with the third embodiment.

As illustrated in FIG. 5, in the third embodiment, a selection switch 335 is arranged in the cab 103*a* to be manipulated for selection by the operator. The selection switch 335 is connected to the controller 13. Upon manipulation to the on position by the operator, the selection switch 335 outputs an on signal to the controller 13, and upon manipulation to the off position by the operator, the selection switch 335 outputs an off signal to the controller 13.

FIG. 6 is a flowchart with step S335 in addition to the flowchart of FIG. 3. After the affirmative determination is made in step S130, the flow advances to step S335 in which the controller 13 determines whether or not the selection switch 335 is manipulated to the on position. If the affirmative determination is made in step S335, the controller 13 sets automatic braking mode, and the flow advances to step S140. If the negative determination is made step S335, the controller 13 sets manual braking mode, and the flow advances to step S180.

In the third embodiment, after the negative determination is made in step S160 or the affirmative determination is made in step S165, the flow returns to step S335. Specifically, the controller 13 does not release the ongoing operation of the swing brake device 20 when the direction of swing operation by the swing control device 9 and the swing direction of the upperstructure 103 under the external force acting on the upperstructure 103 are the same.

Even if the external force is so small that it has little effect on the upperstructure 103, a brake is applied to the upperstructure 103. However, in the embodiment, the operating state of the swing brake device 20 is maintained when the direction of swing operation by the swing control device 9 and the swing direction of the upperstructure 103 under the external force acting on the upperstructure 103 are the same. This makes it impossible for the upperstructure 103 to be swung by normal manipulation. Therefore, the operator determines whether or not automatic brake control is selected. If the automatic brake control is not selected, the operator may manipulate the selection switch 335 to the off position.

In this manner, according to the third embodiment, the following advantageous effects can be produced in addition to the advantageous effects of the first embodiment.

(6) When the selection switch 335 is off, if the swing motor brake switch 12 is manipulated from the actuation position to the release position, then the ongoing operation of the swing motor brake 3 and the swing brake device 20 are released. Thus, because the ongoing operations of the swing motor brake 3 and the swing brake device 20 can be released by turning off the selection switch 335, it is possible to perform hoisting in a working process, such as gravity center positioning in slinging work and/or the like, while the swing motor brake 3 and the swing brake device 20 are maintained in the release state.

The following modifications are within the scope of the present invention, and one of the modifications or some of the modifications may be used in combination with the above-described embodiment/embodiments.

Modification 1

Figure 7:
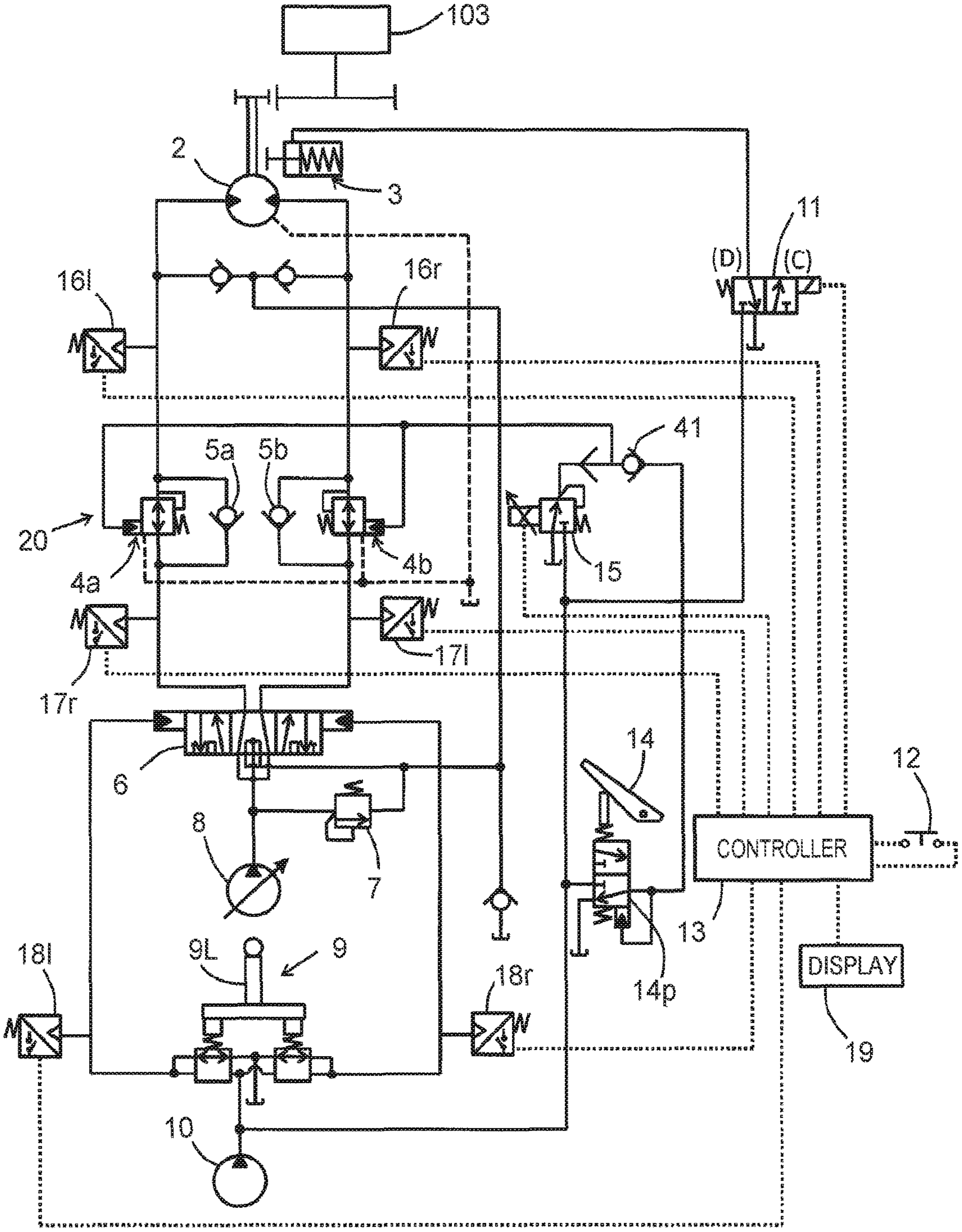
FIG. 7 is a schematic diagram of a hydraulic circuit to drive a swing hydraulic motor of a crane in accordance with an example modification 1.

Although in the above embodiments, an example is provided of the configuration where the controller 13 adjusts the decompression degree of the solenoid proportional pressure reducing valve 15 in order to generate a hydraulic braking force through the brake control valves 4*a*, 4*b*, the present invention is not limited to the configuration. As illustrated in FIG. 7, a brake pedal 14 may be installed in the cab 103*a*, so that a hydraulic braking force through the brake control valves 4*a*, 4*b* may be generated based on the amount of depression of the brake pedal 14. Such a configuration may be further added.

The swing brake device 20 of a crane in accordance with the modification 1 has a brake pedal 14, a pilot valve 14*p* and a high-pressure selector valve 41 in addition to the configuration of the crane in the first embodiment. The pilot valve 14*p* is supplied with pilot pressure oil from the pilot pump 10. The pilot valve 14*p* generates a secondary pressure, i.e., a pilot pressure Pp2 based on the amount of depression of the brake pedal 14, and then outputs the pilot pressure Pp2 to the pilot ports of the brake controlvalves 4*a*, 4*b*. The pilot valve 14*p* increases the pilot pressure Pp2 as an increase of the amount of depression of the brake pedal 14.

The high-pressure selector valve 41 selects the higher one of the pilot pressure Pp1 generated by the solenoid proportional pressure reducing valve 15 and the pilot pressure Pp2 generated by the pilot valve 14*p*, and then outputs the selected pilot pressure to the pilot ports of the brake control valves 4*a*, 4*b*.

According to such a modification, for example, after the swing brake device 20 is released by the processing in step S180 in the flowchart of FIG. 3, the pilot pressure Pp2 is generated and output based on the amount of depression of the brake pedal 14 by the pilot valve 14*p*, so that the magnitude of the hydraulic braking force generated by the swing brake device 20 is able to be adjusted.

Modification 2

Figure 8:
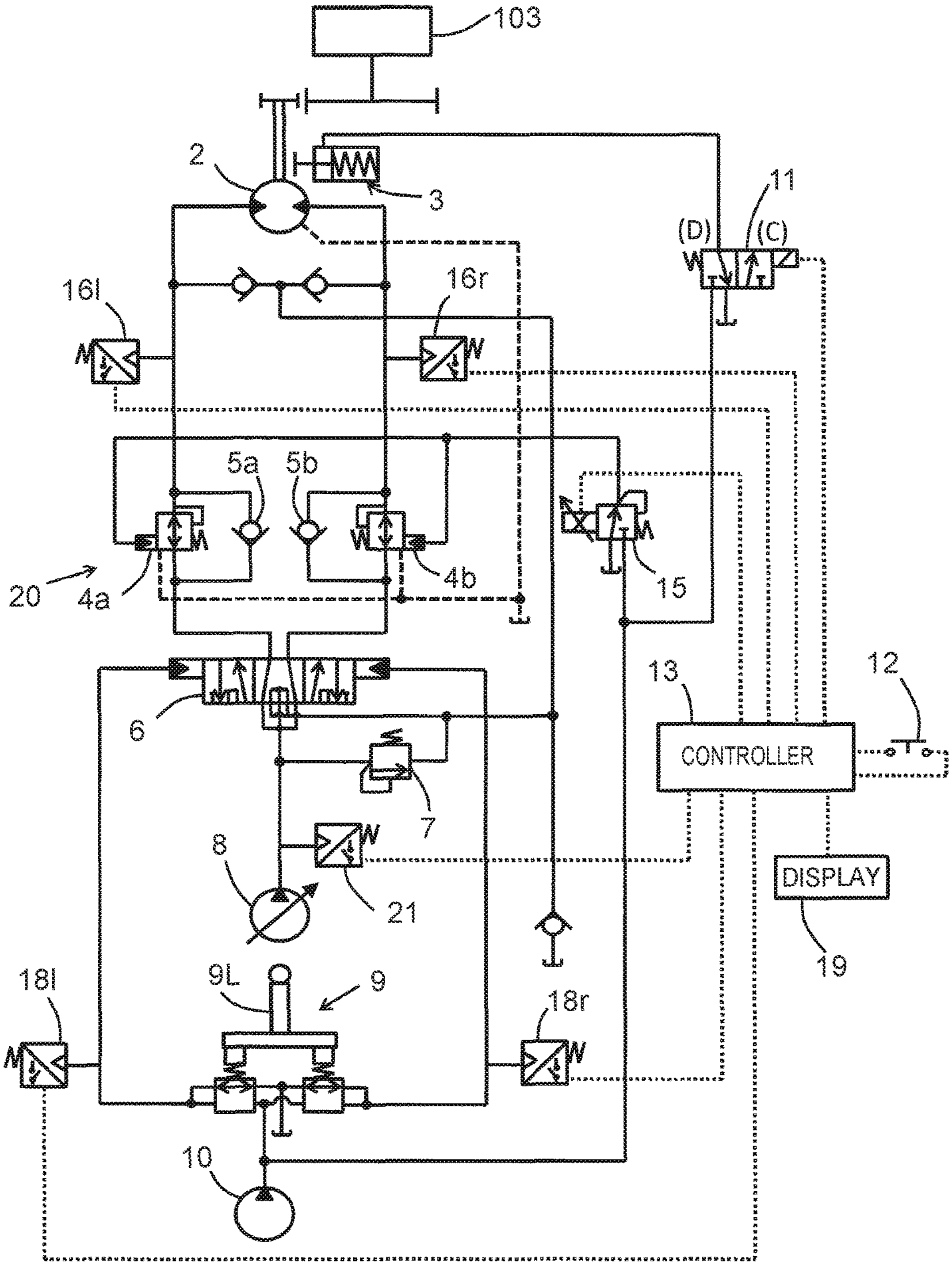
FIG. 8 is a schematic diagram of a hydraulic circuit to drive a swing hydraulic motor of a crane in accordance with an example modification 2.

Although in the above-described embodiments, an example is provided where the higher one of the outlet pressures detected by the right outlet pressure sensor 17*r* and the left outlet pressure sensor 17*l* is selected as the drive pressure Pd which is then compared with the holding pressure Ph (see step S170 of FIG. 3), the present invention is not limited to the example. For example, as illustrated in FIG. 8, a discharge pressure sensor 21 may be installed to detect a discharge pressure of the hydraulic pump 8, so that the discharge pressure of the hydraulic pump 8 may be determined as the drive pressure Pd which is then compared with the holding pressure Ph. According to the modification, the number of pressure detection devices can be reduced as compared with the first embodiment.

Modification 3

Although in the above-described embodiments, an example is provided the configuration where a pressure reducing valve is used for the brake control valves 4*a*, 4*b*, the present invention is not limited to the example. As the brake control valves 4*a*, 4*b*, various valve devices capable of closing the flow passage on the return side of the hydraulic motor 2 may be be employed such as a selector valve, a flow control valve and/or the like.

Figure 9:
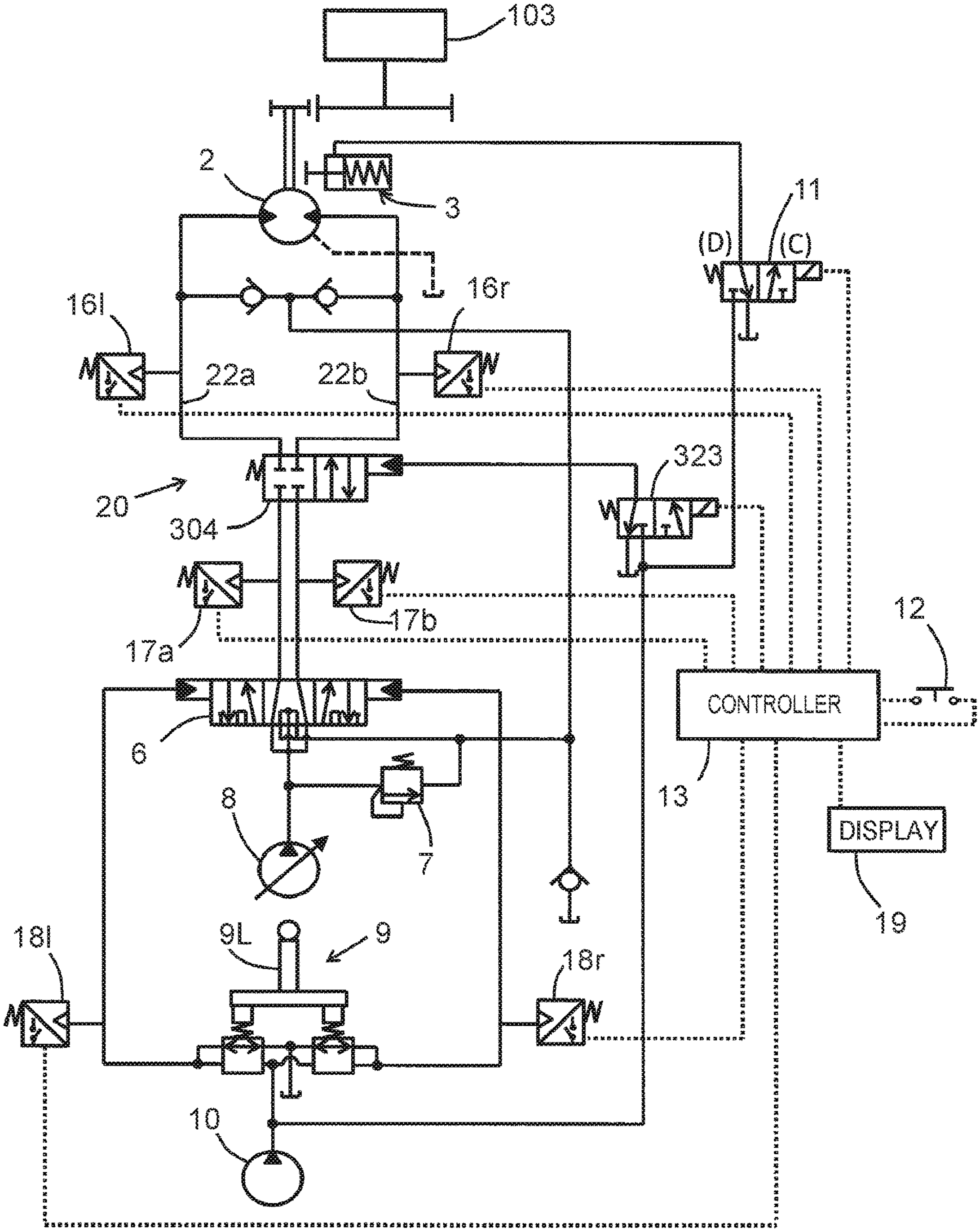
FIG. 9 is a schematic diagram of a hydraulic circuit to drive a swing hydraulic motor of a crane in accordance with an example modification 3.

For example, as illustrated in FIG. 9, a brake control valve 304 may be installed in an oil passage between the directional control valve 6 and the hydraulic motor 2. The brake control valve 304 is a selector valve switched between a shut-off position and a communication position, in which the shut-off position is for blocking the oil passage between the directional control valve 6 and the hydraulic motor 2, and the communication position is for communicably unblocking the oil passage between the directional control valve 6 and the hydraulic motor 2.

The controller 13 is connected to a solenoid selector valve 323. The solenoid selector valve 323 is switched in response to a control signal from the controller 13. The controller 13 outputs an on signal to the solenoid selector valve 323, thereby energizing the solenoid to switch the solenoid selector valve 323 into a pump communication position. Upon the solenoid selector valve 323 being switched into the pump communication position, the pilot pressure oil discharged from the pilot pump 10 is supplied to a pilot port of the brake control valve 304, thereby in turn switching the brake control valve 304 into the communication position. Upon the brake control valve 304 being switched into the communication position, a communication between the hydraulic motor 2 and the directional control valve 6 is established. Thus, the brake control valve 304 results in an open valve, so that the flow of oil retuning from the hydraulic motor 2 is not restricted by the brake control valve 304.

The controller 13 outputs an off signal to the solenoid selector valve 323, thereby de-energizing the solenoid to cause the solenoid selector valve 323 to be switched into a tank communication position by a spring force. Upon the solenoid selector valve 323 being switched into the tank communication position, a tank pressure acts on the pilot port of the brake control valve 304, so that the brake control valve 304 is switched into the shut-off position by a spring force. Upon the brake control valve 304 being switched into the shut-off position, the passages 22*a*, 22*b* of the hydraulic motor 2 are closed, thus generating a hydraulic braking force.

According to such modification, similar advantageous effects to those in the above embodiments are provided.

Modification 4

Although in the above-described embodiments an example is provided where the display 19 is used as a notification device to notify of the swing direction of the upperstructure 103 under an external force acting on the upperstructure 103, the present invention is not limited to this example. Instead of the display 19, a voice output device may be employed as the notification device.

Modification 5

Although in the above-described embodiments an example is provided where wind power being the external force acting on the upperstructure 103, the present invention is not limited to this example. The present invention is applicable to the situation where the crane is placed in a hilly terrain, so that gravitation acts on the upperstructure 103 as the external force.

Modification 6

Although in the aforementioned embodiments an example is provided where the external-force decision unit 13*c* decides the higher one of the two right and left motor backpressures Pbr and Pbl as the holding pressure Ph representing the magnitude of the external force, the present invention is not limited to the example. For example, a characteristic table in which an external force level raises with an increase of the holding pressure Ph may be prestored in the storage device of the controller 13. The external-force decision unit 13*c* may look up the table to calculate, based on the holding pressure Ph, the external-force level representing the magnitude of the external force acting to the upperstructure 103. The display control unit 13*h* may causes the display 19 to display the calculated external-force level on the display screen.

Modification 7

Although in the aforementioned embodiments an example is provided where the swing control device 9 and the directional control valve 6 are of a hydraulic pilot type, the present invention is not limited to this example. The present invention may be applied to a crane including an electric swing control device and a directional control valve switched in response to a control signal output from the controller 13. In this case, the controller 13 detects the direction of swing manipulation and the manipulated variable on the basis of the manipulated variable of the swing lever (the operating angle of the lever) of the electric swing control device.

Modification 8

Although in the aforementioned embodiments the crawler crane including the travel base 101 and the upperstructure 103 mounted swingably relative to the travel base 101 has described as an example, the present invention is not limited to this. The present invention is applicable to various neutral-free mode cranes including a frame and a upperstructure mounted swingably relative to the frame. The present invention is also applicable to a stationary crane including a upperstructure mounted swingably relative to a fixed frame, such as a fixed crane and the like, without limiting to the mobile crane.

Although the above has described various embodiments and modifications, the present invention is not limited to the details thereof. The present invention is intended to cover any other aspects conceived without departing from the scope and spirit of the present invention.

What is claimed is:

1. A crane, comprising:

a hydraulic circuit including a hydraulic pump, a hydraulic motor, and a control valve having a neutral free position, the hydraulic pump and the hydraulic motor being connected through the control valve;

a notification device;

an upperstructure driven to swing by the hydraulic motor;

a swing control device controlling the control valve for swing operation of the upperstructure;

a swing brake device installed between the hydraulic motor and the control valve and having a flow restrictor that limits a flow of oil on a return side of the hydraulic motor, the swing brake device limiting oil on the return side of the hydraulic motor to generate a hydraulic braking force;

a first backpressure detector detecting a motor backpressure between the flow restrictor and one of ports of the hydraulic motor as a first motor backpressure;

a second backpressure detector detecting a motor backpressure between the flow restrictor and the other port of the hydraulic motor as a second motor backpressure; and a control device having an external-force direction estimation unit that estimates a swing direction of the upperstructure under an external force acting on the upperstructure on the basis of the first motor backpressure and the second motor backpressure during an operating state of the swing brake device, and a notification control unit that causes the notification device to provide notification of the estimated swing direction of the upperstructure.

2. The crane according to claim 1, wherein the control device has an external-force decision unit that decides a magnitude of an external force acting on the upperstructure, and the notification control unit causes the notification device to provide notification of a magnitude of an external force acting on the upperstructure.

3. The crane according to claim 1, further comprising a drive pressure detector that detects a drive pressure of the hydraulic motor, wherein the control device includes a direction determination unit that determines whether a direction of swing operation by the swing control device and a swing direction of the upperstructure under an external force acting on the upperstructure are the same or opposite directions, and a brake control unit, if a direction of swing operation by the swing control device and a swing direction of the upperstructure under an external force acting on the upperstructure are opposite directions to each other during an operating state of the swing brake device, when the drive pressure is lower than a higher one of the first motor backpressure and the second motor backpressure, the brake control unit maintaining the operation of the swing brake device, and when the drive pressure is higher than the higher one of the first motor backpressure and the second motor backpressure, the brake control unit releasing the operation of the swing brake device.

4. The crane according to claim 3, wherein, if the direction of swing operation by the swing control device and the swing direction of the upperstructure under an external force acting on the upperstructure are the same directions during the operating state of the swing brake device, the brake control unit release the operation of the swing brake device.

5. The crane according to claim 3, wherein the flow restrictor has a valve to reducing a flow passage area of the return side of the hydraulic motor in accordance with an increase of a pilot pressure input, and the swing brake device has a solenoid valve that outputs a pilot pressure to the flow restrictor on the basis of a control signal from the control device, the crane further comprising:

a braking force adjustment device outputting a pilot pressure to the flow restrictor on the basis of a manipulated variable of a brake manipulation member in order to adjust a magnitude of a hydraulic braking force generated by the swing brake device; and a high-pressure selector valve that selects a higher one of a pilot pressure output from the solenoid valve and a pilot pressure output from the braking force adjustment device and then outputs the selected one to the flow restrictor.

* * * * *